US007140362B1

(12) United States Patent
Johnston

(10) Patent No.: US 7,140,362 B1
(45) Date of Patent: Nov. 28, 2006

(54) OUTDOOR COOKING APPARATUS

(76) Inventor: Johnny R. Johnston, P.O. Box 806, Miami, OK (US) 74355

( * ) Notice: Subject to any disclaimer, the term of this patent is extended or adjusted under 35 U.S.C. 154(b) by 169 days.

(21) Appl. No.: 10/971,873

(22) Filed: Oct. 22, 2004

(51) Int. Cl.
    *A47J 37/07*   (2006.01)
    *A47J 37/00*   (2006.01)
    *A47J 37/04*   (2006.01)
    *F24B 3/00*   (2006.01)

(52) U.S. Cl. .................. 126/25 A; 126/25 R; 126/30; 99/421 HV

(58) Field of Classification Search ............. 126/25 A, 126/25 R, 41 E, 39 E; 99/340, 421 HV, 99/445–448, 407, 28–30
See application file for complete search history.

(56) References Cited

U.S. PATENT DOCUMENTS

| | | | | |
|---|---|---|---|---|
| 955,140 | A * | 4/1910 | Cronk | 126/30 |
| 1,853,319 | A | 4/1932 | Polhemus | 126/14 |
| 2,213,483 | A | 9/1940 | Benson | 126/9 R |
| 2,507,243 | A | 5/1950 | Boyd et al. | 99/421 R |
| 2,691,368 | A | 10/1954 | Hood | 126/25 R |
| 2,968,301 | A | 1/1961 | Cowart | 126/25 A |
| 4,043,260 | A | 8/1977 | LaPour et al. | 99/421 HH |
| 4,062,275 | A * | 12/1977 | Appel et al. | 99/393 |
| 4,462,306 | A | 7/1984 | Eisendrath | 99/340 |
| 4,541,406 | A | 9/1985 | DaSambiagio | 126/9 R |
| 4,788,906 | A * | 12/1988 | Starks | 99/450 |
| 5,473,979 | A * | 12/1995 | Ruben | 99/446 |
| 5,809,988 | A | 9/1998 | Wagner | 126/25 A |
| 5,826,497 | A * | 10/1998 | Basso | 99/446 |
| 5,850,829 | A * | 12/1998 | Taylor et al. | 126/30 |
| 5,865,099 | A * | 2/1999 | Waugh | 99/340 |
| 5,931,085 | A * | 8/1999 | Benzschawel | 99/449 |
| 5,983,882 | A | 11/1999 | Ceravolo | 126/25 R |
| 6,543,435 | B1 * | 4/2003 | Regen et al. | 126/25 R |
| 6,711,993 | B1 * | 3/2004 | Robertson | 99/448 |

\* cited by examiner

*Primary Examiner*—Ehud Gartenberg
*Assistant Examiner*—Sarah E. Suereth
(74) *Attorney, Agent, or Firm*—William R. Sharp

(57) ABSTRACT

An outdoor cooking apparatus is provided which comprises: a housing having an open upper end, a closed lower end, and at least one sidewall extending between the upper and lower ends; a pipe having an open upper end and an open lower end; a cover having an opening therethrough and mounted on the pipe such that the pipe adjacent to its open upper end is closely received by the opening in the cover, the cover being adapted to fit over the open upper end of the housing; a combustibles receptacle having an opening therethrough and being mounted on the pipe such that the pipe adjacent to its open lower end is closely received by the opening in the receptacle, the receptacle also having a periphery and being receivable within the housing such that the periphery is spaced from the sidewall of the housing; at least one food grill mounted on the pipe between the cover and the combustibles receptacle, the food grill(s) being receivable within the housing; and a support and vertical adjustment mechanism for supporting the pipe and associated cover, combustibles receptacle, and food grill(s), and also allowing vertical adjustment thereof between (i) an upper position for which the receptacle is adjacent to the open upper end of the housing and at least a substantial portion of the pipe, the food grill(s), and the cover are outside of and above the housing, and (ii) a lower position for which the cover fits over the open upper end of the housing and at least a substantial portion of the pipe, the food grill(s), and the receptacle are within the housing.

9 Claims, 5 Drawing Sheets

OUTDOOR COOKING APPARATUS

BACKGROUND OF THE INVENTION

This invention relates to outdoor cooking equipment of the type which includes a combustibles receptacle in which a solid combustible material, preferably charcoal, may be contained below a food grill. Food items, especially meats, cooked with burning charcoal have a unique and highly desirable flavor which is not obtainable with a cooking apparatus employing a combustible gas such as propane.

However, in cooking large portions of meat (i.e. whole chickens) with a conventional apparatus using charcoal, it is difficult to thoroughly cook the meat to its center without charring the outer parts. Moreover, a bed of charcoal frequently burns out and must be replenished during the required cooking time, which is obviously inconvenient and undesirable.

SUMMARY OF THE INVENTION

The invention is an outdoor cooking apparatus which overcomes the problems discussed above, and comprises: a housing having an open upper end, a closed lower end, and at least one sidewall extending between the upper and lower ends; a pipe having an open upper end and an open lower end; a cover having an opening therethrough and mounted on the pipe such that the pipe adjacent to its open upper end is closely received by the opening in the cover, the cover being adapted to fit over the open upper end of the housing; a combustibles receptacle having an opening therethrough and being mounted on the pipe such that the pipe adjacent to its open lower end is closely received by the opening in the receptacle, the receptacle also having a periphery and being receivable within the housing such that the periphery is spaced from the sidewall of the housing; at least one food grill mounted on the pipe between the cover and the combustibles receptacle, the food grill(s) being receivable within the housing; and support and vertical adjustment means for supporting the pipe and associated cover, combustibles receptacle, and food grill(s), and also allowing vertical adjustment thereof between (i) an upper position for which the receptacle is adjacent to the open upper end of the housing and at least a substantial portion of the pipe, the food grill(s), and the cover are outside of and above the housing, and (ii) a lower position for which the cover fits over the open upper end of the housing and at least a substantial portion of the pipe, the food grill(s), and the receptacle are within the housing. According to a preferred embodiment hereafter described in detail, the support and vertical adjustment means includes a winch, a cable, associated pulleys, and a supporting stem extending through the pipe.

In the above-mentioned upper position, food items can be positioned upon or removed from the food grill(s) and/or the combustibles receptacle can be loaded with solid combustible material (i.e. charcoal) or cleaned out. The lower position, with the cover received over the open upper end of the housing, is primarily for when the cooking apparatus is not in use. When in operation cooking food items, the cover is preferably positioned slightly above (i.e. ½–¾ inch) the open upper end of the housing to provide a passage for exhaust.

During operation of the cooking apparatus, air is believed to be drafted into the open upper end of the pipe so as to flow downwardly through the pipe and out through the open lower end into the housing immediately below the combustibles receptacle. The uniquely drafted air can then pass upwardly around the periphery of the receptacle as spaced from the sidewall of the housing, thus providing a slow but steady and evenly distributed supply of oxygen to burning combustible material, preferably charcoal, in the receptacle.

The slow burning charcoal in the receptacle will heat the interior of the housing and "slow cook" the food items, especially large meat portions, on the grill(s) for about 4–7 hours without the need to replenish any of the charcoal. The cooking apparatus and food items therein can usually be left alone for the entire cooking time for optimum convenience. Large meat portions, such as whole chickens, are thoroughly cooked without outer charring.

DETAILED DESCRIPTION OF THE INVENTION

Figure 1:
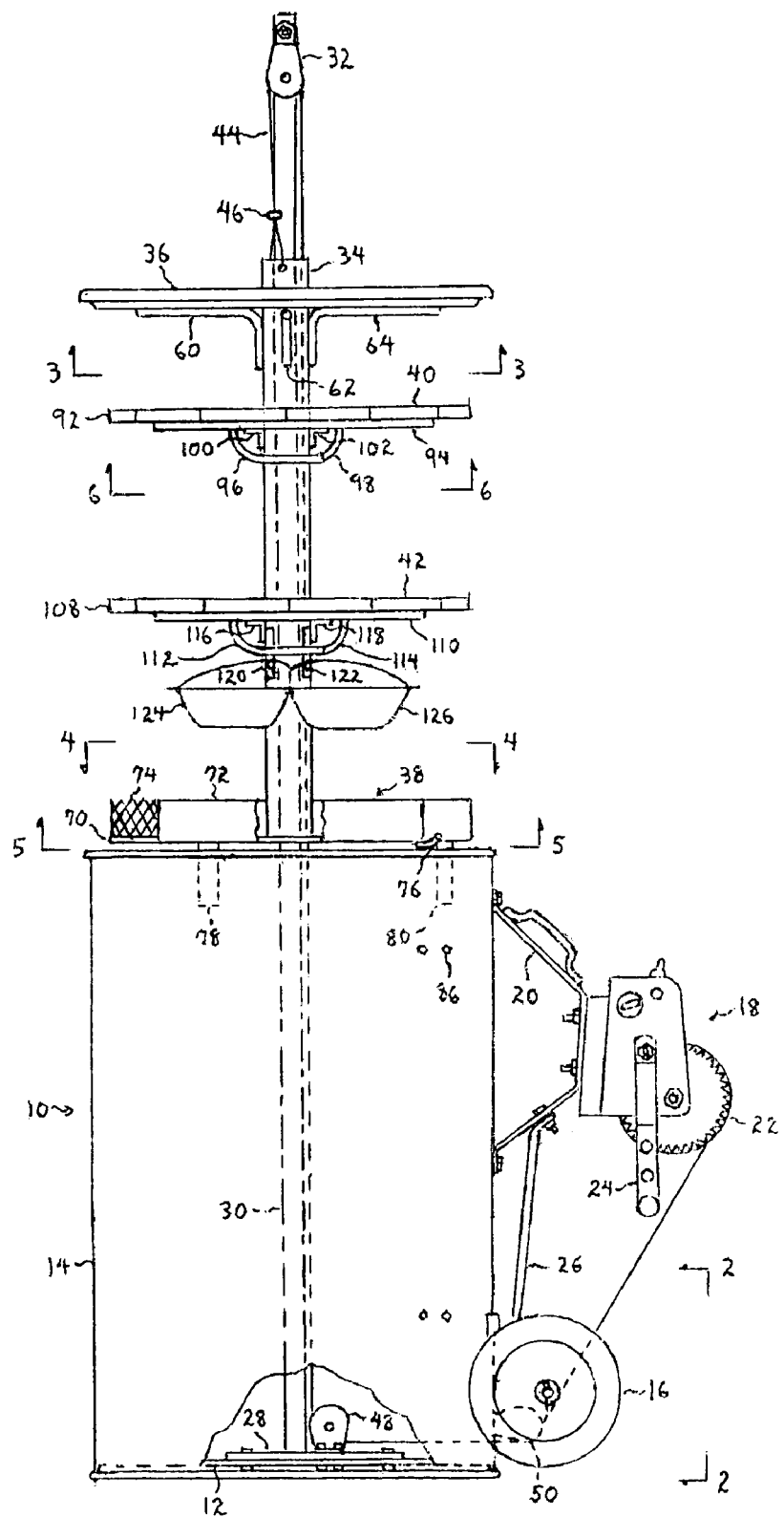
FIG. 1 is an elevational view of one embodiment of the outdoor cooking apparatus in accordance with the invention, showing the pipe and associated cover, combustibles receptacle, and food grills mounted thereon at the above-mentioned upper position.

Referring to FIG. 1, the illustrated apparatus includes a housing 10 having an open upper end, a closed lower end defined by a bottom wall 12, and a sidewall 14 extending between the upper and lower ends. Housing 10 can be a standard 55 gallon barrel that is widely available and inexpensive. A pair of wheels, of which only one is visible in FIG. 1 and indicated at 16, are rotatably mounted to sidewall 14 adjacent to the closed lower end of housing 10 in a manner discussed further below. A winch 18, of the type having a clutch, is fixedly mounted to sidewall 14 by means of winch bracket 20 and suitable bolts and nuts. Winch 18 includes a drum or reel 22 and a hand operable crank 24 for rotating the reel. The upper end of a brace 26 is bolted to winch bracket 20 and the lower end is bolted to an axle bracket shown in another FIGURE.

A portion of sidewall 14 is broken away to reveal internal details, including a plate 28 bolted to bottom wall 12 and a vertically oriented stem 30 having a lower end welded to the plate within housing 10. Stem 30, of which portions are shown in broken lines, extends from its lower end and through the open upper end of housing 10 to an upper end. As shown, a pulley 32 is mounted to stem 30 with a bolt and nut adjacent to the upper end of the stem.

The apparatus further includes a pipe 34 having an open upper end and an open lower end. Stem 30 extends through pipe 34 such that the upper end of the stem is above the open upper end of the pipe as in its upper position. Pipe 34 has mounted thereon several components of the apparatus later described in detail, including: a cover 36 adjacent to the open upper end of pipe 34; a combustibles receptacle 38 adjacent to the open lower end of pipe 34; and a pair of food grills 40 and 42 between cover 36 and combustibles receptacle 38.

Continuing to refer to FIG. 1, an end portion of a cable 44 is connected to pipe 34 adjacent to its open upper end by means of a loop received through a pair of holes in the pipe and secured with a cable clamp 46. As shown, a short upper end portion of pipe 34 extending above cover 36 has the pair of holes through which the loop is received. Cable 44 extends from pipe 34 to and over pulley 32, down through pipe 34 from its open upper end to and through its open lower end, and then through the interior of housing 10 to a pulley 48. Pulley 48 is bolted to plate 28 and bottom wall 12 within housing 10. Cable 44 extends horizontally from pulley 48 through a hole (not visible in FIG. 1) in sidewall 14 to a pulley 50 (in broken lines) suitably mounted to the sidewall exterior to housing 10. Cable 44 finally runs from pulley 50 to reel 22 of winch 18. With reel 22 suitably locked in position, cable 44 supports pipe 34 and associated cover 36, combustibles receptacle 38, and food grills 40 and 42 in the illustrated upper position for which receptacle 38 is adjacent to the open upper end of housing 10 and at least a substantial portion of the pipe (in this case all of the pipe), the food grills, and the cover are outside of and above the housing.

Figure 2:
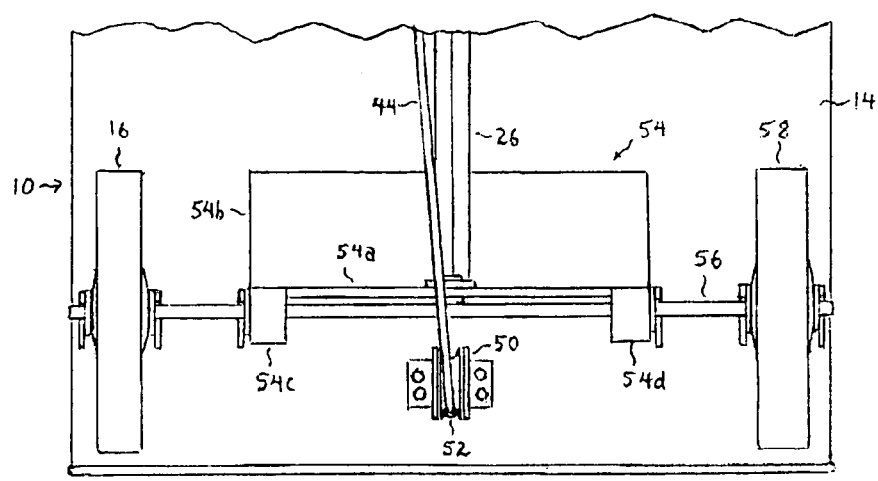
FIG. 2 is a fragmentary view of the apparatus as viewed along line 2—2 in FIG. 1.

Referring to FIG. 2, this fragmentary view shows pulley 50 bolted to sidewall 14 and the above-mentioned hole in the sidewall, as indicated at 52, adjacent to the closed end of housing 10 and immediately adjacent to pulley 50. As discussed above, cable 44 extends through hole 52 to pulley 50. This FIGURE further shows an axle bracket 54 having a horizontally oriented portion 54a to which the lower end of brace 26 (previously discussed with reference to FIG. 1) is secured with a bolt and nut, a vertically oriented portion 54b similarly secured to sidewall 14 of housing 10 with bolts obscured by brace 26, and opposing depending portions 54c and 54d with holes for receiving an axle 56 therethrough. Wheel 16 and the other wheel 58 are rotatably received on opposing ends of axle 56. The wheels are held in their desired longitudinal positions with washers and cotter pins, and axle 56 is similarly held in its illustrated position with respect to axle bracket 54. Wheels 16 and 58 are positioned slightly above the lower end of housing 10 so that the housing can sit flat on a supporting surface (not shown). When it is desired to move the apparatus, it is simply tipped back until the wheels contact the supporting surface and the lower end of housing 10 is above and out of contact with such surface. The apparatus can then be easily rolled to a desired location.

Figure 3:
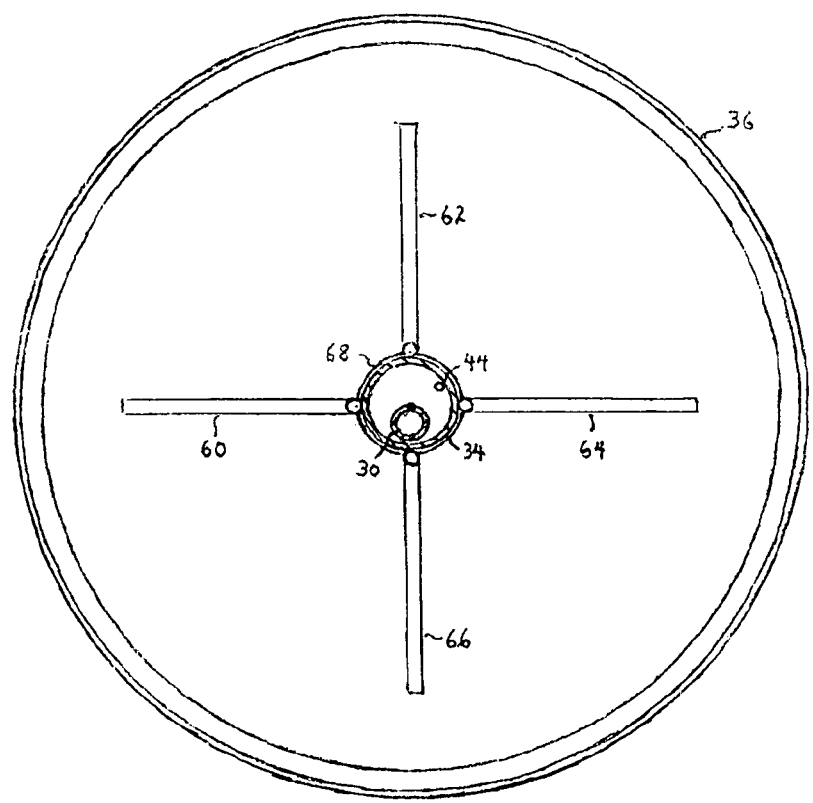
FIG. 3 is a bottom view of the cover as viewed along line 3—3 in FIG. 1.

Turning now to a detailed description of those components mounted on pipe 34 and associated features, and referring again to FIG. 1, this FIGURE shows three of four L-shaped rods for supporting cover 36 in its illustrated position on pipe 34. Each of the illustrated rods 60, 62, and 64 has a vertical portion welded to pipe 34 and a horizontal portion. Cover 36 rests upon but is not connected to the horizontal portions. Referring to FIG. 3, this FIGURE shows the fourth rod 66, having a vertical portion and horizontal portion like the other L-shaped rods. Only the ends of the vertical portions are visible in FIG. 3. FIG. 3 further illustraes pipe 34, stem 30, and cable 44 in cross section. Stem 30 is offset from the center of pipe 34. Although stem 30 is a pipe having a smaller diameter than pipe 34 in the illustrated embodiment, stem 30 could be any suitably strong elongated member receivable through pipe 34. Pipe 34 is closely received by an opening 68 in cover 36, but the cover is not connected to pipe 34.

Referring back to FIG. 1, combustibles receptacle 38 includes a bottom wall 70 with an outer edge, and a sidewall 72 extending around and welded to a substantial portion of the outer edge. A metallic mesh insert 74 is received on, but not connected to, the upper surface of bottom wall 70 adjacent to the remaining portion of the outer edge of bottom wall 70. Mesh insert 74 is freely removable from receptacle 38 for the purpose of easing the task of cleaning out the receptacle. As shown, a portion of sidewall 72 is broken away to reveal a lower end portion of pipe 34 extending from bottom wall 70. FIG. 1 further shows an outwardly extending pin 76 welded to the lower surface of bottom wall 70, and vertically oriented legs 78 and 80 (mostly in broken lines) having their upper ends welded to the lower surface of bottom wall 70. A third leg is not visible in FIG. 1. The purpose of pin 76 and the legs will be discussed further below.

Figure 4:
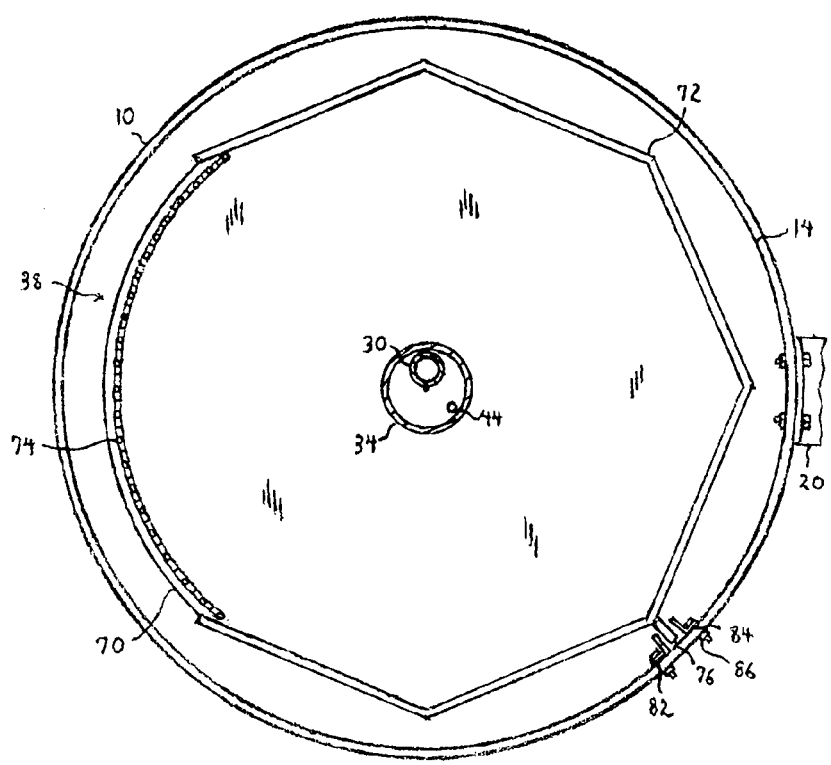
FIGS. 4 and 5 are respective top and bottom views of the combustibles receptacle as viewed along lines 4—4 and 5—5 in FIG. 1.

The view of FIG. 4 shows the open upper end of housing 10, the upper edge of sidewall 72, the upper edge of mesh insert 74, the upper surface of bottom wall 70, as well as pipe 34, stem 30, and cable 44 in cross section. As is apparent from FIG. 4, sidewall 72 defines a substantial portion of the periphery of receptacle 38. A pair of vertically oriented angle iron sections 82 and 84 are bolted within housing 10 to its sidewall 14 so as to define a guide channel between the sections which vertically extends along and adjacent to the interior surface of the sidewall. Pin 76 is aligned with and receivable in this channel to prevent rotational movement of receptacle 38 and the other components mounted on pipe 34 when being lowered or raised within housing 10. One of the nuts for securing the angle iron sections to sidewall 14 is indicated at 86 in FIG. 4 as well as in FIG. 1.

Figure 5:
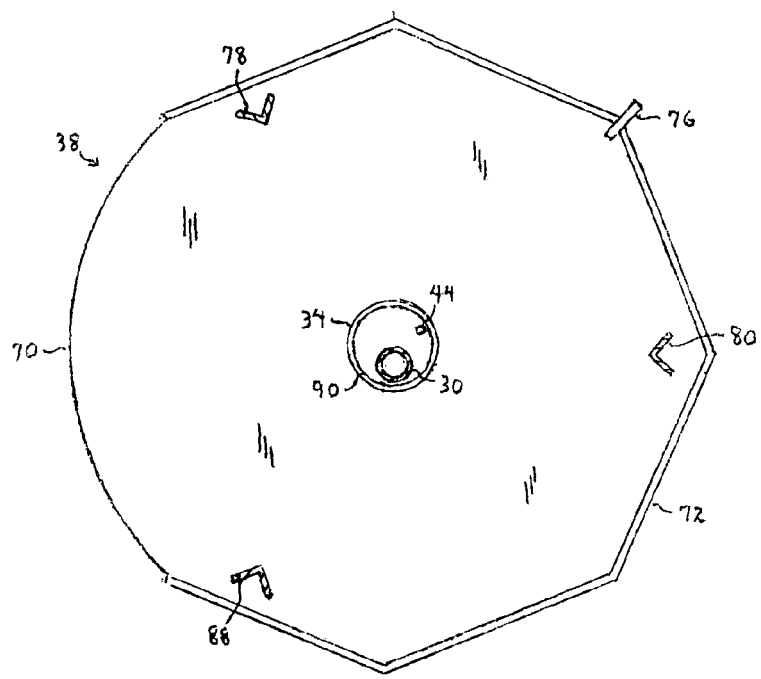

The view of FIG. 5 shows the lower edge of sidewall 72, the lower surface of bottom wall 70, pin 76, legs 78 and 80 in cross section, and the third leg 88 also in cross section. Legs 78, 80, and 88 comprise sections of angle iron in the illustrated embodiment. The open lower end of pipe 34 is also shown in FIG. 5. Pipe 34 adjacent to such open lower end is closely received by an opening 90 in bottom wall 70. Pipe 34 is fixedly mounted to bottom wall 70 of receptacle 38 by welding at opening 90. The open lower end of pipe 34 is preferably substantially flush with the lower surface of bottom wall 70. Stem 30 and cable 44 are also shown in cross section in FIG. 5.

Figure 6:
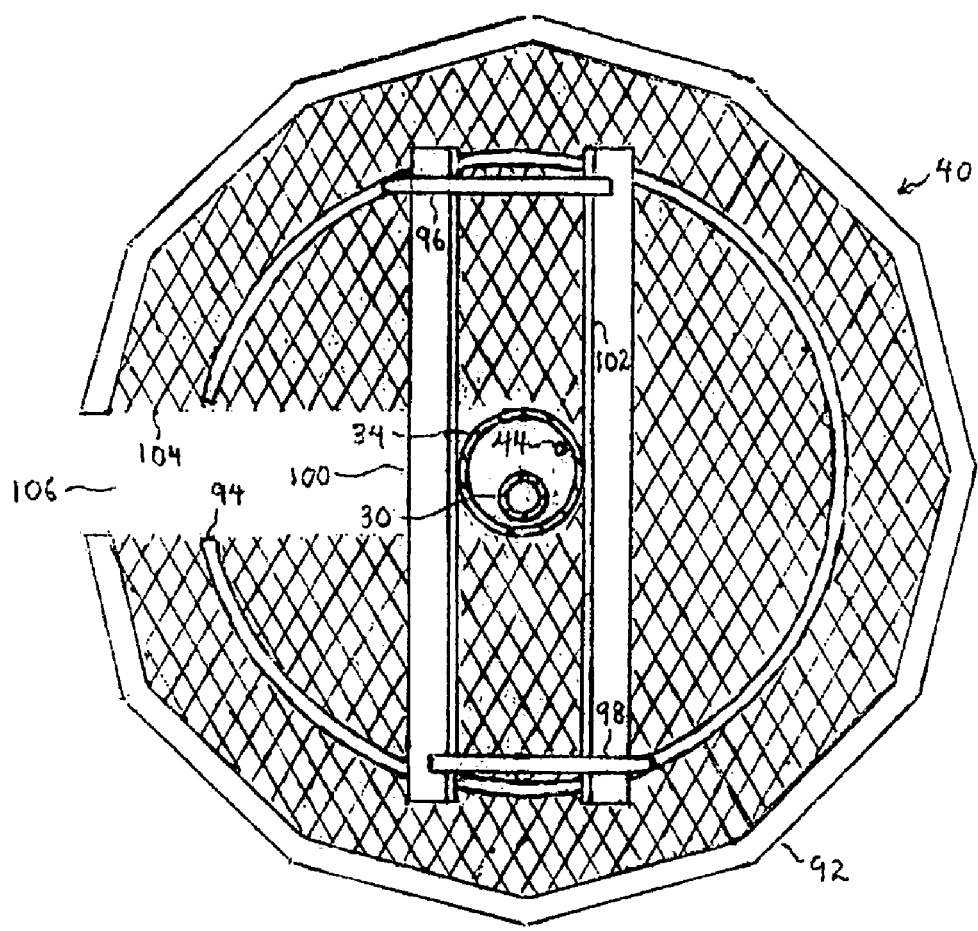
FIG. 6 is a bottom view of one food grill as viewed along line 6—6 in FIG. 1.

With regard to food grill 40, and referring to FIG. 1, this food grill includes a peripheral rim 92, reinforcement rod 94, and a pair of hooks 96 and 98 welded to rod 94. A pair of horizontally oriented support members 100 and 102 (only ends of which are visible in FIG. 1) are welded to pipe 34 on opposite sides thereof. Support members 100 and 102 support food grill 40 and are engaged by hooks 96 and 98. Food grill 40 and support members 100 and 102 will be further explained with reference to FIG. 6. Support members 100 and 102 are shown in FIG. 6 as being elongated, and are most conveniently sections of angle iron substantially parallel to one another as shown. FIG. 6 further shows peripheral rim 92 as defining the periphery of food grill 40, and a metallic mesh 104 having its outer edge fixedly mounted and preferably welded to peripheral rim 92. Reinforcement rod 94 is formed into a generally circular shape and welded to the lower surface of mesh 104. Rod 94 is in contact with, but not connected to, support members 100 and 102 such that the support members support food grill 40. Hooks 96 and 98 are engaged with and extend under support members 100 and 102 adjacent to the ends thereof so as to securely hold food grill 40 in position. An elongated opening 106 in food grill 40 radially extends from peripheral rim 92 to an inner, central portion through which pipe 34 extends. Pipe 34 as well as stem 30 and cable 44 are shown in cross section in FIG. 6.

Food grill 40 is easily removable for cleaning by twisting the food grill in a counterclockwise direction (as the grill is viewed in FIG. 6) until hooks 96 and 98 are out of engagement with support members 100 and 102, with elongated opening 106 positioned to allow food grill 40 to be radially pulled away from pipe 34. To reinstall food grill 40, elongated opening 106 is positioned to receive pipe 34 and to allow food grill 40 to be radially pushed back into position with pipe 34 extending through the inner centrally located portion of elongated opening 106. Food grill 40 is then twisted in a clockwise direcion (as the grill is viewed in FIG. 6) to reengage hooks 96 and 98 with support members 100 and 102.

As shown in FIG. 1, food grill 42 is similar to food grill 40 in having a peripheral rim 108, a reinforcing rod 110, and a pair of hooks 112 and 114. Food grill 42 also has a metallic mesh like food grill 40 that is not visible in FIG. 1. A pair of support members 116 and 118 are welded to pipe 34. Support members 116 and 118 support food grill 42 and are engaged by hooks 112 and 114. Hanger rods 120 and 122 are respectively welded to and depend from support members 116 and 118. Water pans 124 and 126 hang from hanger rods 120 and 122, respectively, by means of wires attached to the pans. The outer lips of water pans 124 and 126 are preferably connected by any suitable means. The apparatus further includes two other water pans obscured by pans 124 and 126. These other water pans hang from hanger rods opposite hanger rods 120 and 122. All water pans hang directly beneath food grill 42.

Figure 7:
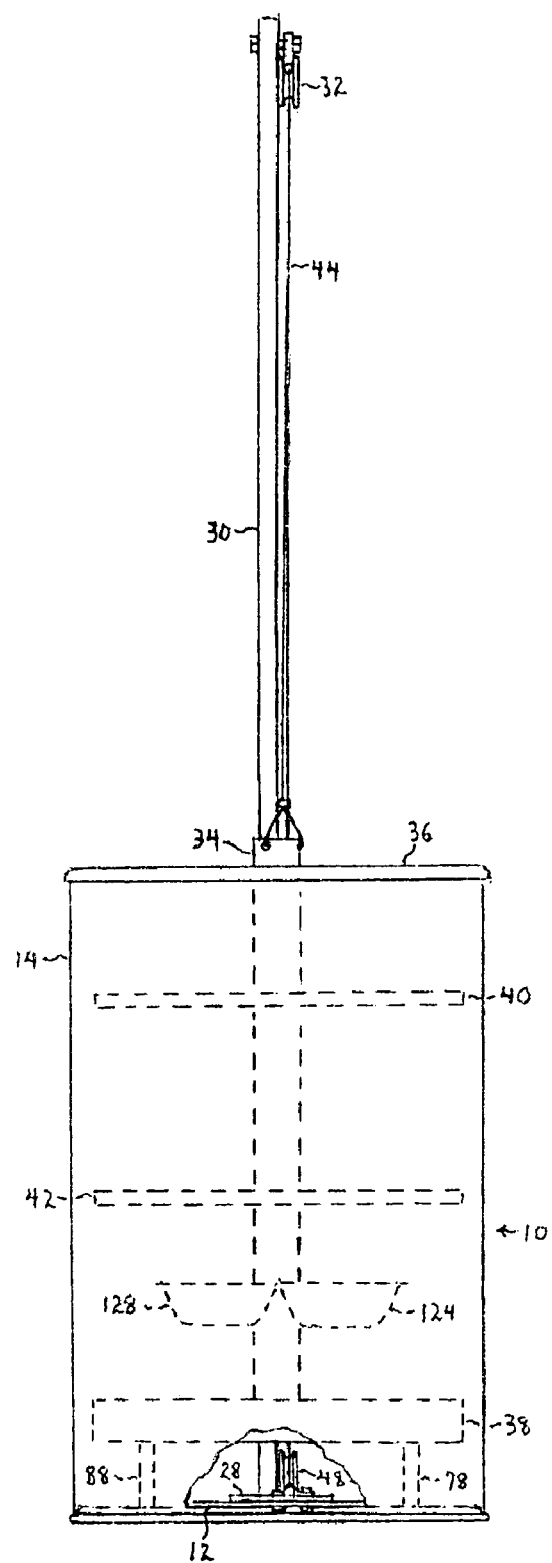
FIG. 7 is an elevational view of the cooking apparatus as viewed from a perspective 90° offset from that of FIG. 1, showing the pipe and associated cover, combustibles receptacle, and food grills in the above-mentioned lower position.

Referring to FIG. 7, this view of the apparatus is from a perspective opposite winch 18 (FIG. 1). FIG. 7 shows pipe 34 and associated cover 36, combustibles receptacle 38, food grill 40, and food grill 42 in their lower position. In such lower position, cover 36 fits over the open upper end of housing 10, and a substantial portion (except for that upper end portion above the cover) of pipe 34, combustibles receptacle 38, food grill 40, and food grill 42 are within the housing and shown in broken lines. The periphery of combustibles receptacle 38, as well as the peripheries of food grills 40 and 42, are shown as being spaced from sidewall 14 of housing 10. FIG. 7 further shows, in broken lines and within housing 10, water pan 124 and another water pan 128 not visible in FIG. 1, as well as legs 78 and 88 depending from receptacle 38 and having their lower ends in contact with bottom wall 12 of housing 10. Leg 80 is similarly situated but is obscured. Typically, the tension on cable 44 is relieved when pipe 34 and associated components mounted thereon are in the lower position, so that bottom wall 12 and the legs support pipe 34, receptacle 38, food grill 40, and food grill 42 (as well as water pans hanging beneath grill 42). A portion of sidewall 14 is broken away in FIG. 7 to show a portion of bottom wall 12, plate 28, pulley 48, and a lower portion of stem 30 in solid lines. That portion of stem 30 extending above pipe 34, and pulley 32 mounted to stem 30, are also in FIG. 7.

Some optional features not shown in the drawings could also be provided in the apparatus. For example, circumferentially spaced guide members could be mounted to sidewall 14 adjacent to the open upper end of housing 10. Such guide members would slant outwardly and extend above the housing to assist in guidance of the cover in its downward movement toward the open upper end of the housing when lowering the pipe and the associated cover. At least one additional food grill could also be provided. Such a food grill could have legs to allow it set upon, but be removable from, a corresponding food grill mounted on the pipe.

Materials employed in the apparatus are preferably strong and durable metals, including the cable, which is preferably comprised of twisted steel wire.

In operation of the apparatus, the winch is employed as a cable control means for selectively raising or lowering (i.e. vertical adjustment of) the pipe and associated cover, combustibles receptacle, and food grills with the cable. In preparation for cooking food items, the pipe and associated components mounted thereon are first vertically positioned in their upper position (FIG. 1). This is typically done by raising the pipe and associated components from their lower position (FIG. 7), in which such pipe and components are normally kept when the apparatus is not in use. The combustibles receptacle is filled with a suitable solid combustible material, preferably charcoal. Wood chips (i.e. hickory) can be added on top of the charcoal for the purpose of flavor enhancement. Water, optionally mixed with butter, is added to the water pans. Food items, such as large meat portions, are placed on the food grills. After appropriate ignititon of the charcoal, the pipe and associated components are lowered to a position in which the cover is preferably slightly above (i.e. ½–¾ inch) the open upper end of the housing to provide a passage for exhaust. The food items are then allowed to slowly cook within the housing, during which time steam produced from the water pans is absorbed by the food items to keep the food items (particular meats) desirably moist. The cooking temperature within the housing is typically slightly above 200°, at around the boiling point of water. After cooking of the food items is complete, the pipe and associated components are raised to their upper position to remove the food items from the food grills. In such upper position, the combustibles receptacle can also be cleaned out once the charcoal cools sufficiently. The pipe and associated components are then lowered back to their lower position while the apparatus is not in use.

As discussed previously, the typical cooking time for a number of large meat portions (i.e. whole chickens) is about 4–7 hours, during which time replenishment of the charcoal will not be necessary. The apparatus will require little or no attention during the entire cooking time. Moreover, large meat portions are thoroughly cooked to their centers, and at the same time are moist and not burned or charred on their outer surfaces. As also discussed above, it is believed that the advantageous aspects of the invention are due at least in part to unique drafting of air through the pipe so as to exit the lower open end thereof immediately below the combustibles receptacle.

Obviously, many modifications and variations of the present invention are possible in light of the above teachings. It is, therefore, to be understood that within the scope of the appended claims the invention can be practiced otherwise than as specifically described.

The invention claimed is:

1. An outdoor cooking apparatus comprising:
 a housing having an open upper end, a closed lower end, and at least one sidewall extending between the upper and lower ends;
 a pipe having an open upper end and an open lower end;
 a cover having an opening therethrough and mounted on the pipe such that the pipe adjacent to its open upper end is closely received by the opening in the cover, the cover being adapted to fit over the open upper end of the housing;

a combustibles receptacle having an opening therethrough and being mounted on the pipe such that the pipe adjacent to its open lower end is closely received by the opening in the receptacle, the receptacle also having a periphery and being receivable within the housing such that the periphery is spaced from the sidewall of the housing;

at least one food grill mounted on the pipe between the cover and the combustibles receptacle, said at least one food grill being receivable within the housing; and support and vertical adjustment means for supporting the pipe and associated cover, combustibles receptacle, and said at least one food grill, and also allowing vertical adjustment thereof between (i) an upper position for which the receptacle is adjacent to the open upper end of the housing and at least a substantial portion of the pipe, said at least one food grill, and the cover are outside of and above the housing, and (ii) a lower position for which the cover fits over the open upper end of the housing and at least a substantial portion of the pipe, said at least one food grill, and the receptacle are within the housing.

2. An outdoor cooking apparatus as recited in claim 1 wherein the housing comprises a barrel.

3. An outdoor cooking apparatus as recited in claim 1 wherein the combustibles receptacle includes a bottom wall with an outer edge, and a sidewall extending around at least a substantial portion of the outer edge, the sidewall of the receptacle defining at least a substantial portion of the periphery of the receptacle.

4. An outdoor cooking apparatus as recited in claim 1 wherein the support and vertical adjustment means comprises: a stem having an upper end and a lower end of which the lower end of the stem is mounted within the housing to the closed lower end thereof, the stem extending from its lower end and through the pipe to its upper end positioned above the open upper end of the pipe as in said upper position; a pulley mounted on the stem adjacent to its upper end; a cable having an end portion connected to the pipe adjacent to its open upper end, the cable extending from the pipe to and over the pulley; and cable control means receiving the cable as extending from the pulley, the cable control means being for selectively raising or lowering the pipe and associated cover, combustibles receptacle, and said at least one food grill with the cable.

5. An outdoor cooking apparatus as recited in claim 4 wherein the cable extends from the pulley, through the pipe from its open upper end to its open lower end, and then to the cable control means.

6. An outdoor cooking apparatus as recited in claim 5 wherein the pulley mounted on the stem adjacent to its upper end is denoted as the first pulley, the sidewall of the housing has a hole therethrough adjacent to the closed lower end of the housing, and the cable control means is mounted to the sidewall of the housing, the apparatus further comprising a second pulley mounted within the housing to the closed lower end thereof and receiving the cable as extending from the open lower end of the pipe, and wherein the cable extends from the second pulley and through the hole in the sidewall to the cable control means.

7. An outdoor cooking apparatus as recited in claim 6 wherein the cable control means comprises a winch.

8. An outdoor cooking apparatus as recited in claim 1 further comprising at least one water pan; and means for hanging said at least one water pan directly beneath said at least one food grill.

9. An outdoor cooking apparatus as recited in claim 1 further comprising a pair of wheels rotatably mounted to the sidewall of the housing adjacent to the closed lower end of the housing.

\* \* \* \* \*